Patented Jan. 8, 1935

1,986,930

UNITED STATES PATENT OFFICE 1,986,930

ENAMEL-LIKE COATING COMPOSITION

John W. Iliff, Ridley Park, and Paul Robinson, Llanerch, Pa., assignors to E. I. du Pont de Nemours & Company, Wilmington, Del., a corporation of Delaware No Drawing. Application June 19, 1930, Serial No. 462,408

4 Claims. (Cl. 134—26)

The use of heat-treated drying oils and semi-drying oils as ingredients in coating compositions has been known for a long time. Oils such as linseed oil and China-wood oil have been heat-treated either in the presence of air or in an inert atmosphere until the desired viscosity and drying characteristics have been obtained. Similar results may be accomplished by blowing drying oils with air at relatively low temperature for considerable periods of time. Various combinations of heat treatment and blowing have been used. Very useful oils have been made by the heat treatment of drying oils in the absence of air until the viscosity has increased to a value in the neighborhood of 400 poises. Materials of this sort have found important uses as the vehicle in compositions intended to resist the action of weather and also in interior enamels. Products containing these oils dry to a relatively hard film with a good initial gloss and can be applied fairly easily with a brush.

There are, however, certain disadvantages connected with the use of these bodied oils. Practically all of them require several days to reach the stage where the surface is free from tackiness. This condition is undesirable from the standpoint of dirt collection. The films laid down from materials of this sort are not hard enough for many purposes and do not satisfactorily resist abrasion and the action of materials used in cleaning them. While the initial gloss is usually good they do not retain this appearance satisfactorily and develop a decided bloom on the surface after having been applied several weeks. They also require a relatively long time to dry to a hard film.

Hardness and gloss have heretofore been secured by combining fossil gums or rosin with the drying oils according to the methods used in the manufacture of spar varnish involving heating or cooking to cause the gum or rosin to combine with the bodied oil. Such compositions, however, are dark in color and darken further when exposed in poorly illuminated places. They also retain their tackiness for a considerable period of time.

This invention has as an object the production of coating compositions especially those of enamel-like character, from bodied or treated oils, which are characterized by a shorter drying time and a higher gloss than is possessed by coating compositions made from treated oil under the present methods. A further object is to eliminate the tackiness which persists for several days in coating compositions made with treated oils. A further object is to impart hardness to the films laid down from coating compositions made with treated oils. A still further object is a process of manufacturing coating compositions having the above noted characteristics.

These objects are accomplished by the following invention in which an oil soluble polyhydric alcohol-polybasic acid resin is blended or dissolved in the cold in a bodied oil of the drying or semi-drying type.

According to the present invention we prepare a polyhydric alcohol-polybasic acid resin modified with sufficient solubilizing agent, as drying oil or drying oil acids, to impart solubility to the resin in the bodied oil. The resin is then blended with or dissolved in the bodied oil, this blending being effected in the cold and preferably during the mixing step when the other ingredients are incorporated into the coating composition.

This blending in the cold of the bodied oil with the oil soluble resins herein disclosed is to be sharply distinguished from the usual practice of causing resins, insoluble in the cold in the bodied drying oil, to blend with the bodied oil by heating or cooking (around 150° C.) the resin with the oil. The present invention, on the other hand, is characterized by the fact that the type of resins disclosed herein may be dissolved in the cold in the bodied oil for the production of our improved coating compositions. The "blending in the cold", or "dissolving in the cold", as used in the claims refer to the fact that our resins blend or dissolve in the bodied oil to a homogeneous solution without the necessity of heating to effect physical changes in the ingredients or chemical interaction between the resin and oil.

The bodied oils and the polyhydric alcohol-polybasic acid resins are referred in detail below the following several examples illustrative of coating compositions embodying our invention:

*Example 1*

|  | Parts by weight |
|---|---|
| Lithopone | 25.3 |
| Zinc oxide | 12.3 |
| Barium base titanium pigment | 12.3 |
| Bodied oil A | 22.7 |
| Resin A | 1.2 |
| Mineral spirits | 25.0 |
| Lead manganese drier | 1.2 |
|  | 100.0 |

Example 2

| | |
|---|---|
| Lithopone | 25.3 |
| Zinc oxide | 12.3 |
| Barium base titanium pigment | 12.3 |
| Bodied oil A | 11.9 |
| Resin B | 12.0 |
| Mineral spirits | 25.0 |
| Lead manganese drier | 1.2 |
| | 100.0 |

Example 3

| | |
|---|---|
| Lithopone | 25.3 |
| Zinc oxide | 12.3 |
| Barium base titanium pigment | 12.3 |
| Bodied oil B | 11.9 |
| Resin A | 12.0 |
| Mineral spirits | 25.0 |
| Lead manganese drier | 1.2 |
| | 100.0 |

Example 4

| | |
|---|---|
| Lithopone | 25.3 |
| Zinc oxide | 12.3 |
| Barium base titanium pigment | 12.3 |
| Bodied oil C | 15.0 |
| Resin A | 8.9 |
| Mineral spirits | 25.0 |
| Lead manganese drier | 1.2 |
| | 100.0 |

Example 5

| | |
|---|---|
| Lithopone | 25.3 |
| Zinc oxide | 12.3 |
| Barium base titanium pigment | 12.3 |
| Bodied oil A | 18.9 |
| Resin C | 5.0 |
| Mineral spirits | 25.0 |
| Lead manganese drier | 1.2 |
| | 100.0 |

Example 6

| | |
|---|---|
| Bodied oil A | 48 |
| Resin B | 50 |
| Cobalt drier | 2 |
| | 100 |

Various other pigments and proportions thereof may be used in place of those mentioned in the above examples. We have, for example, prepared three coating compositions corresponding to Example 1 wherein the following pigments were used instead of the pigment mentioned:

(1) Titanium pigment 32 parts, zinc oxide 17 parts;
(2) Basic lead carbonate 40 parts, zinc oxide 17 parts;
(3) Iron oxide 30 parts.

The boiled oils mentioned in the above examples are as follows:

Oil A

Linseed oil kettle bodied in the absence of air at a temperature of 525° F. to a viscosity of 500 poises.

Oil B

| | |
|---|---|
| Linseed oil | 85 |
| China wood oil | 15 |
| | 100 |

The mixture is kettle bodied in the absence of air at a temperature of 525° F. to 425 poises.

Oil C

| | |
|---|---|
| Linseed oil | 90 |
| China wood oil | 10 |
| | 100 |

The mixture is kettle bodied to a viscosity of 100 poises and blown with air for two hours at 150° F.

It is to be understood that the term "bodied oil", or "heat polymerized drying oil" as used in the claims refers to a polymerized drying or semi-drying oil of high viscosity and that the oil may be heat polymerized, or it may be bodied by a combined heating and blowing method. Oils prepared by blowing alone are subject to severe yellowing and are therefore not so satisfactory for the purposes of the present invention.

The composition of the resins mentioned in the preceding examples is indicated below:

Resin A

| | |
|---|---|
| Glycerol | 12.8 |
| Phthalic anhydride | 28.0 |
| Linseed oil | 59.2 |
| | 100.0 |

Resin B

| | |
|---|---|
| Glycerol | 12.8 |
| Phthalic anhydride | 28.0 |
| Soya bean oil | 59.2 |
| | 100.0 |

Resin C

| | |
|---|---|
| Glycerol | 17.1 |
| Phthalic anhydride | 27.1 |
| Linseed oil acids | 55.8 |
| | 100.0 |

Since the method of making these resins forms no part of the present invention, this matter is not set forth in detail. We prefer to use drying oil rather than the drying oil acids, and in accordance with this mode of procedure the polyhydric alcohol, glycerol, is heated with a drying or semi-drying oil until solution occurs and the mixture of glyceride formed is then heated with a polybasic acid until resinification occurs. The resins produced by this method yield clear light colored coating compositions which are of especial value in the practice of the present invention. It is not satisfactory when making the resins by this method to substitute the oil acids for the oils. It is to be understood, however, that this invention is not limited to this method of making the resins. We may also use suitable resins prepared by known methods, in which drying oil acids may optionally replace the drying oils, as for instance, methods which involve heating all the ingredients together at the same time. The drying and semi-drying oils and oil acids mentioned herein are referred to in the claims as fatty oils and fatty oil acids.

These resins should contain about 58% drying oil. By the term "58% drying oil" as used herein we refer not only to the drying or semi-drying oil itself, but also the equivalent thereof, as for instance the equivalent amount of the oil acids or mixtures of oil and oil acids.

Resinous substances other than the polyhydric alcohol-polybasic acid resins of the type described, will not accomplish the objects desired in this invention. For example fossil gums, rosin, and synthetic resins modified with such gums cannot be cold blended with the bodied oil, and are, therefore, inoperative for the purposes of the present invention.

The coating compositions set forth in the examples have the brushing characteristics of the coating composition made from bodied oil vehicle but the drying speed and many of the other film characteristics are similar to those of a composition made entirely from an oil modified polyhydric alcohol-polybasic acid resin. Our improved coating compositions not only have superior drying and brushing qualities, but the films laid down are hard, have a high gloss and are free from tackiness. Clear light colored coating compositions, such as indicated by Example 6 may be produced which yield films that retain their light color.

As many apparently widely different embodiments of this invention may be made without departing from the spirit and scope thereof, it is to be understood that we do not limit ourselves to the specific embodiments thereof except as defined in the appended claims.

We claim:

1. The process of manufacturing a coating composition which comprises heating together a drying oil and glycerol, heating the glyceride so formed with phthalic anhydride until resinification occurs, and blending said resin in the cold in a heat polymerized drying oil, said first mentioned drying oil constituting about 58% of the resin.

2. A process of manufacturing a coating composition which comprises dissolving in the cold in a drying oil bodied with heat treatment to a viscosity within the range of about 100 poises to 500 poises, an oil modified resin containing in chemically combined form not less than about 58% drying oil, said resin being the reaction product of phthalic anhydride with resin ingredients selected from the class consisting of (a) and (b), where (a) is a mixture of glycerides obtainable by heating fatty oil with glycerol, and (b) is a mixture of glycerol with fatty oil acids.

3. A process of manufacturing a coating composition which comprises blending in the cold heat treated drying oil bodied to a viscosity of about 100 to 500 poises with a polyhydric alcohol-polybasic acid resin containing in chemically combined form sufficient drying oil to render said resin soluble in the cold in said bodied drying oil.

4. A coating composition comprising a solution of a resin in drying oil bodied with heat treatment, said resin being soluble in the cold in bodied drying oil and being a polyhydric alcohol-polybasic acid resin containing in chemically combined form sufficient drying oil to render said resin soluble in the cold in said bodied drying oil.

JOHN W. ILIFF.
PAUL ROBINSON.